(12) United States Patent
Willis et al.

(10) Patent No.: US 6,228,200 B1
(45) Date of Patent: May 8, 2001

(54) BELT PRESS USING DIFFERENTIAL THERMAL EXPANSION

(75) Inventors: John A. Willis, Louviers (FR); Adrian J. Willis, Raleigh, NC (US)

(73) Assignee: Belt Equipment, Inc., Zebulon, NC (US)

( * ) Notice: Subject to any disclaimer, the term of this patent is extended or adjusted under 35 U.S.C. 154(b) by 0 days.

(21) Appl. No.: 09/392,993

(22) Filed: Sep. 9, 1999

(51) Int. Cl.[7] ................................................. B30B 15/34
(52) U.S. Cl. ........................ 156/228; 156/583.1; 100/321
(58) Field of Search .................................. 156/228, 580, 156/583.1; 100/315, 321

(56) References Cited

U.S. PATENT DOCUMENTS

| | | | |
|---|---|---|---|
| 4,164,440 | 8/1979 | Previati | 156/583.1 |
| 4,431,474 | 2/1984 | Gronek et al. | 156/583.1 |
| 4,769,106 | 9/1988 | Busching | 156/497 |
| 4,855,011 | 8/1989 | Legge et al. | 156/583.1 |
| 4,917,741 | 4/1990 | Thies et al. | 156/73.1 |
| 4,946,541 | 8/1990 | Thies et al. | 156/580 |
| 4,964,943 | 10/1990 | Kruger et al. | 156/498 |
| 5,468,315 | * 11/1995 | Okada et al. | 156/64 |
| 5,470,428 | * 11/1995 | Sanko | 156/498 |
| 5,555,798 | * 9/1996 | Miyashita et al. | 100/93 P |
| 5,562,796 | 10/1996 | Ertel | 156/498 |
| 5,578,159 | * 11/1996 | Miyashita et al. | 156/358 |
| 5,635,014 | * 6/1997 | Taylor | 156/358 |

* cited by examiner

*Primary Examiner*—James Sells
(74) *Attorney, Agent, or Firm*—Coats & Bennett, PLLC

(57) ABSTRACT

A belt press uses differential thermal expansion between parts of a platen assembly to generate pressure. The belt press typically includes substantially aluminum platen assemblies that are connected such that movement of the second press surface away from said first press surface is limited. A plurality of expansion limiting rods are aligned generally parallel to the top platen's longitudinal axis and attached thereto. The expansion limiting rods preferably are attached via adjustable couplings to sturdy anchor bars laterally disposed across the platen and rest against two or more bridging rods midway along the length of the platens. The expansion limiting rods have a coefficient of thermal expansion that is smaller than the coefficient of thermal expansion for the platens. When the platen assemblies are heated, the expansion limiting rods resist the thermal expansion of the platen assemblies and press inwardly against the platens, thereby generating a compression force for joining or repairing a belt between press surfaces by leveraging off the high temperatures typically required for belt joint forming, rather than from some additional force supplier such as high pressure air or hydraulic lines.

26 Claims, 4 Drawing Sheets

BELT PRESS USING DIFFERENTIAL THERMAL EXPANSION

FIELD OF THE INVENTION

The present invention relates generally to presses for forming belt joints, and more particularly to a press typically used for joining belt ends to form a belt joint.

BACKGROUND OF THE INVENTION

Belts, and more particularly conveyor belts, are typically manufactured in long strips which are spliced together in one or more locations to form a continuous loop. Due to the stresses imposed on the conveyor belts, it is important that the splice be as high a quality as possible so as to prevent, or at least delay, belt failure at the splice. Over time, a number of methods have been employed to splice belt ends together. The simplest method is the butt splice where the opposing ends of the belt are cut and then bonded together, such as by glue or stapling. Such butt splices are weak. Stronger splices are achieved when there is some sort of overlapping of the two belt ends, such as when the top half of one end and the bottom half of the other end are removed and the complementary portions of the ends are overlapped and bonded together by gluing, etc., and thereafter vulcanized with presses having heated platens. For some applications, it is desirable to form stepped splices having staggered overlapping levels, as disclosed in co-pending application Ser. No. 09/105,682, entitled "Belt Splitting Machine," which is incorporated by reference herein in its entirety. In addition, the belt material of the complementary opposing ends may be formed into an interleaved finger arrangement.

A number of belt presses have been designed. Typically, such presses rely on either hydraulic pressure or inflatable bladders to supply the compression force between opposing platens. For instance, U.S. Pat. No. 4,946,541 to Thies et al. discloses a hydraulic press while U.S. Pat. No. 5,562,796 to Ertel discloses a inflatable bladder press. Hydraulic presses suffer from the disadvantages of requiring extra equipment, such as hydraulic pressure sources, and being unduly complicated. Inflatable bladder presses likewise require additional equipment, such as high pressure air supplies, involve undue complexity, and suffer from the potential for bladder failure.

In light of the above, there remains a need for a simplified belt press which can provide reliable performance for forming belt joints. It is preferred that such a press require a minimum of supply connections.

SUMMARY OF THE INVENTION

The belt press of the present invention generates a compression force for joining or repairing a belt between press surfaces by relying on differential thermal expansion between parts of at least one platen assembly to generate the required pressure. The belt press advantageously leverages off the high temperatures already required for good belt joint forming, rather than relying on some additional force supplier such as high pressure air or hydraulic lines.

In one preferred embodiment, the belt press includes two platen assemblies, for illustrative purposes, a top and bottom platen assembly, disposed about a section of belt. Preferably, the two platen assemblies are substantially identical, but this is not required. The platen assemblies are connected such that relative separation movement between the platen assemblies (e.g., vertically apart) is limited, typically by a plurality of clamps attached to either end of the platen assemblies. At least one of the platen assemblies has at least one, and preferably a plurality of expansion limiting rods aligned generally parallel to the platen's longitudinal axis and attached to the respective platen at or near the ends of the platen. The expansion limiting rods preferably are attached via adjustable couplings to sturdy anchor bars laterally disposed across the platen and rest against two or more bridging rods midway along the length of the platen.

The expansion limiting rods have a coefficient of thermal expansion that is smaller than the coefficient of thermal expansion for the platen, at least along the direction of the longitudinal axis. When the platen assembly is heated, the expansion limiting rods resist the thermal expansion of the platen assembly which causes the platens to bow slightly. Because the preferred bridging rods are bowed outwardly and press inwardly against the bridging rods when resisting the thermal expansion of the platen, the platens are urged to press inwardly together, thereby generating the compressive pressing force.

Preferably, the platen assemblies include an outer U-channel with a plurality of inner U-channels affixed thereto, for structural rigidity among other reasons. In addition, the platen assemblies may include several means for distributing and equalizing heat and pressure, the details of which are described below. However, other than through deflection caused by constrained thermal expansion, the platen assemblies preferably include no moving parts (other than valves, switches, and the like).

The belt press of the embodiment described immediately above includes a minimum of moving parts, thereby increasing product reliability. Most notably, the failure-prone inflatable bladders of the prior art are eliminated. The main parts of the belt press need only be supplied with electrical power and coolant to function optimally. There is no need for high pressure air or hydraulic pressure generators. In addition, because the bulk of the platen assemblies may be made from aluminum, or other light, but strong materials, the weight of the platen assemblies is reduced.

DETAILED DESCRIPTION

Figure 1:
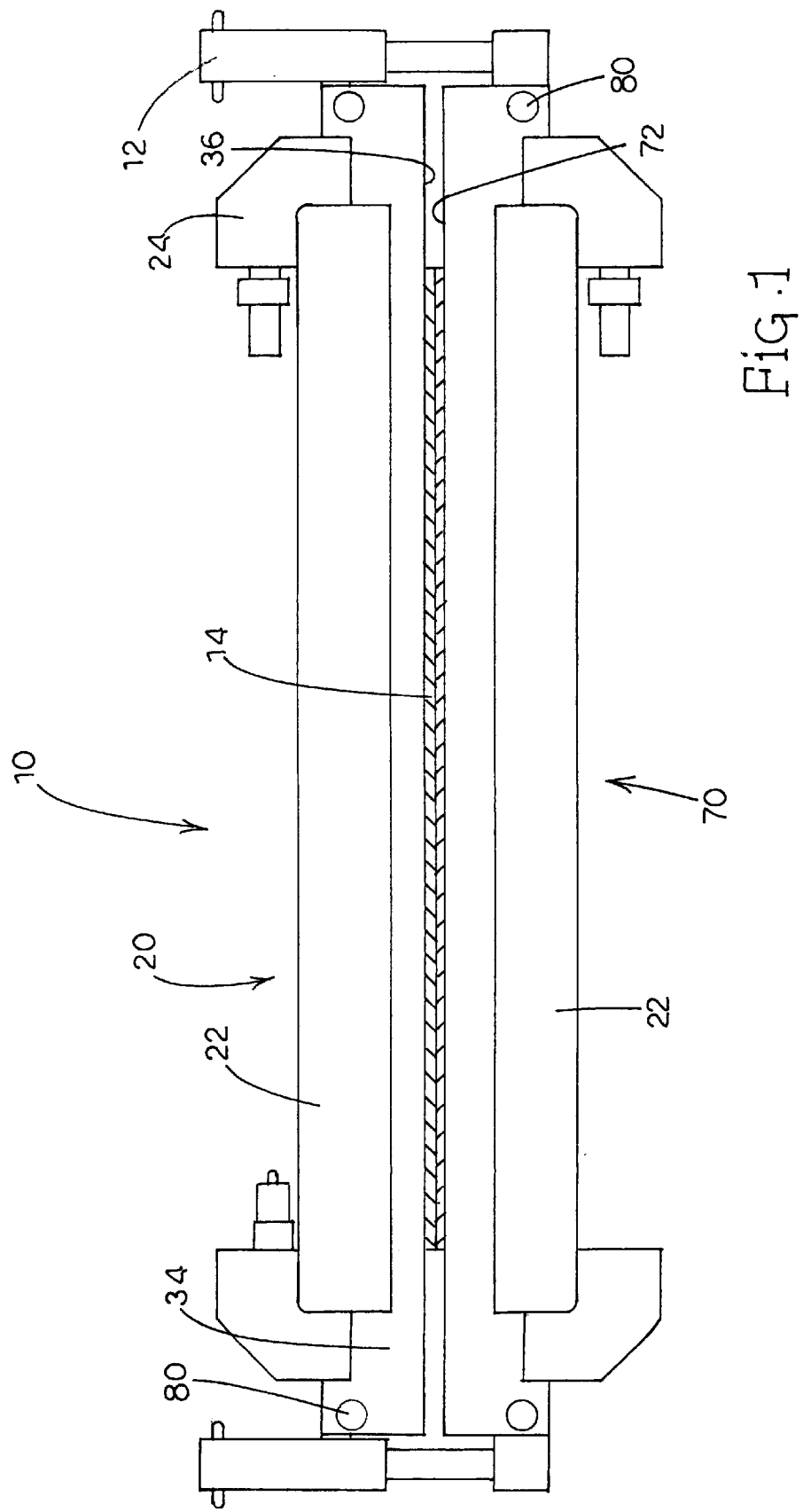
FIG. 1 is a side view of one embodiment of the belt press of the present invention.

The present invention utilizes differential thermal expansion to provide the majority of the compressive force between platens of a belt press 10. The belt press 10 may be used for joining new, or repairing old, conveyor belts or power transmission belts, and the like, but the invention is not so limited. For instance, the belt press 10 may be used to add or repair molding on belts, or to emboss belts, both of which fall within the scope of the present invention. The belt press 10 is particularly adapted for rubber belts, but may be used on belts of various thermoplastic materials.

One embodiment of the belt press 10 of the present invention is shown in FIGS. 1–4. The belt press 10 includes two platen assemblies, which will be referred to as the upper platen assembly 20 and the lower platen assembly 70. It is to be understood however, that the relative positions of the platen assemblies 20,70 may obviously be reversed and any directional reference, such as "upper" and "lower" are for ease of reference to the drawings only and are not intended to be limiting. The upper platen assembly 20 is generally parallel to the lower platen assembly 70, but spaced apart therefrom. The space between the platen assemblies 20,70 is for the belt material 14 to occupy, but is shown as empty in some Figures for simplicity. As such, it is intended that the platen assemblies 20,70 be held together during use by side clamps 12, with the belt material 14 sandwiched therebetween.

The upper platen assembly 20 includes a main platen 34 and a cover 22. The main platen 34 is preferably a channel having a generally U-shaped cross section. The base of the U-channel forms the upper press surface 36, while the sidewalls 38 provide some rigidity against bending in the direction normal to the press surface 36. For ease of description, the main platen 34 has a longitudinal axis 39 running from one end to the other end, generally parallel to the press surface 36.

Figure 3:
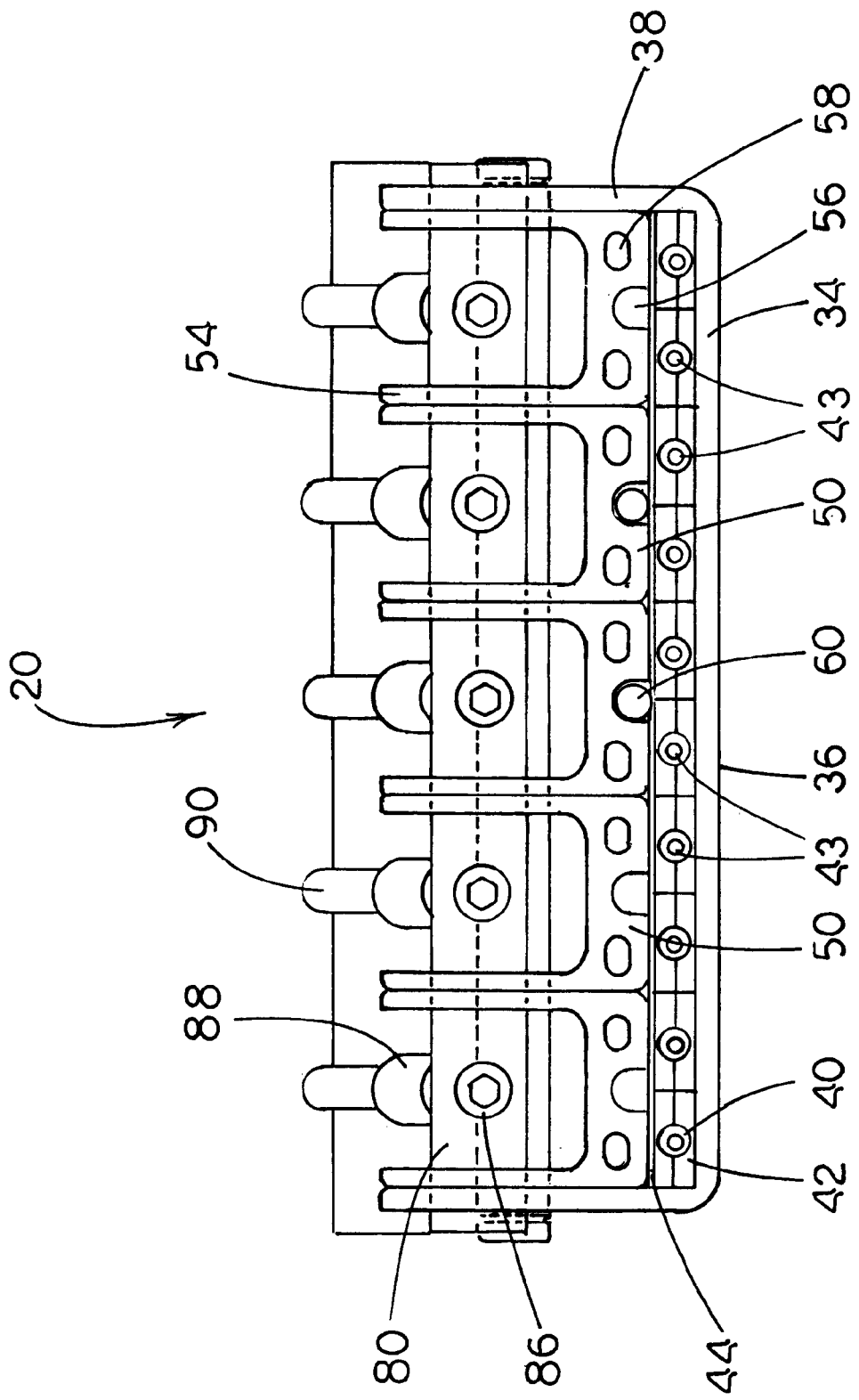
FIG. 3 an end view of the top platen of FIG. 1 with the cover and some heating elements removed for clarity.

Immediately above the press surface portion 36 of the main platen 34 are a plurality of coolant passages 40. These passages may be formed integral to the main platen channel 34, or by any suitable means known in the art. Preferably, the coolant passages 40 are formed by a plurality of coolant blocks 42 arranged as shown in FIG. 3. The lower surfaces of the coolant blocks 42 are preferably flat and mate tightly against the main platen channel 34 so as to provide a uniform transfer of heat and force. Likewise, the upper surfaces of the coolant blocks 42 are preferably flat. The coolant blocks 42 preferably provide one or more watertight passages 40 for passing externally supplied coolant, such as cool water, through, but it is believed that the coolant passages 40 may be somewhat leaky without unduly hindering the performance of the belt press 10. Alternatively, a cooling tube 43, such as a thin-walled stainless steel tube, may be disposed in each cooling passage 40. The cooling passages 40, or the cooling tubes 43 if used, may be joined on their end into one or more flow circuits so that cooling fluid may be easily routed from one cooling passage 40 to another.

A uniformity plate 44 may be optionally disposed above the coolant blocks 42 for evening out by conduction any thermal differences between the coolant blocks 42. At each end of the main platen 34 is an anchor bar 80 that connects to each sidewall 38 of the main platen. This anchor bar 80 should be a sturdy bar as it will bear substantial loads. While the anchor bar 80 may have any cross-section, the anchor bar 80 preferably is round.

The cover 22 overlays at least a portion of the main platen channel 34 so as to substantially enclose the inner portion of the U-channel. The cover 22 of FIG. 1 includes two housings 24, one near each end of the upper platen assembly 20. These housings 24 provide safe connection points for electricity and coolant and suitable space for routing the necessary wires and tubes to the appropriate locations. The housings 24 may alternatively be separate from the cover 22 while still serving the same overall purposes. The cover 22, including the housings 24, may be made from suitable material such as sheet aluminum, sheet steel, plastic, or the like.

Figure 2:
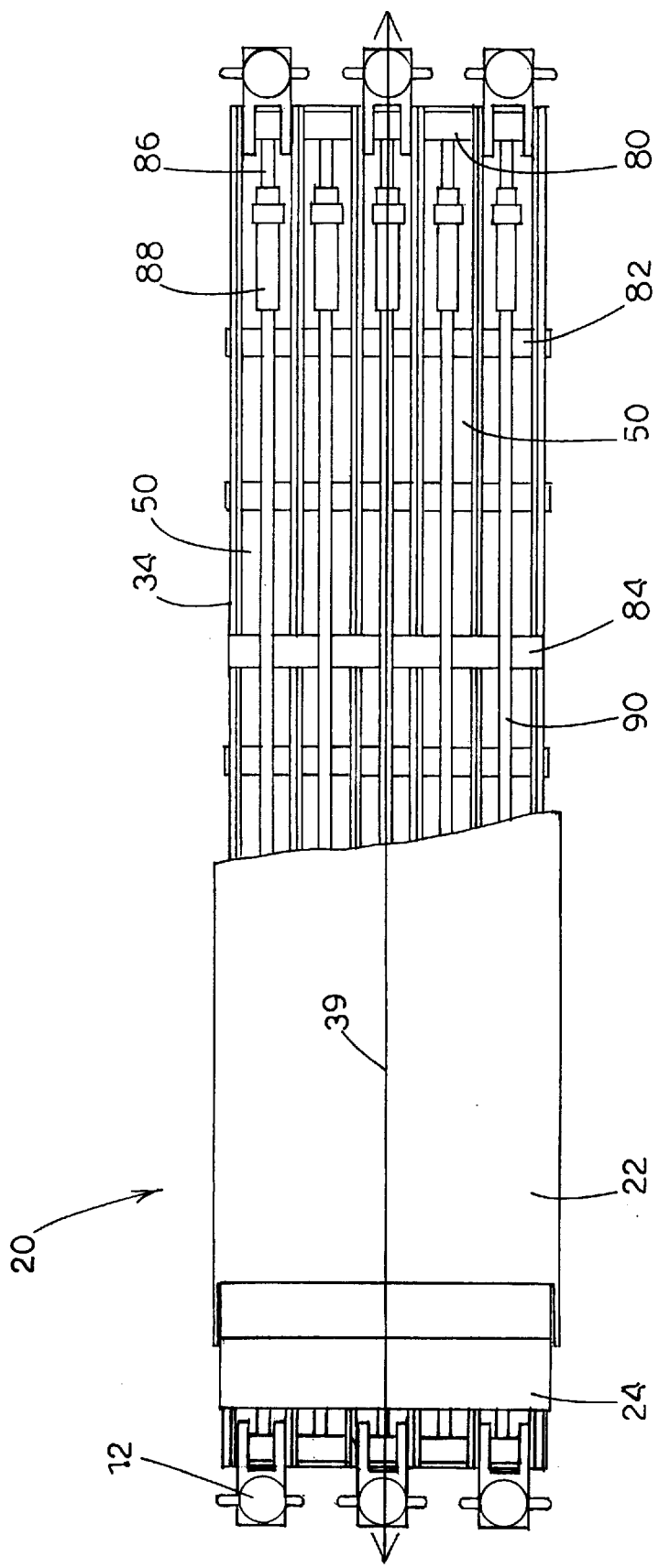
FIG. 2 is a top view of the belt press of FIG. 1 with the cover partially removed.

The upper platen assembly 20 is preferably reinforced by a plurality of smaller channels 50 disposed within the sidewalls 38 of the main platen channel 34 as shown in FIGS. 2–3. The smaller channels 50, sometimes referred to herein as sub-channels 50, preferably run substantially the entire length of the main platen channel 34 and are secured to the main platen channel 34 by passing the anchor bars 80 through the sidewalls 54 of the sub-channels 50. Preferably, the sub-channels 50 preferably fit snuggly side-to-side within the U-channel of the main platen channel 34, just above the optional uniformity plate 44. In addition to the anchor bars 80, additional binding bars 82 held in place by spring clips (not shown), or other means, may be added along the length of the platen assembly 20 to bind the sub-channels 50 to the main platen channel 34.

The underside of the sub-channels 50 include longitudinal grooves 56 designed to tightly fit around respective heating elements 60. These heating elements 60 are preferably cylindrically rod-shaped and extend from one end of the sub-channel 50 to the other. The heating elements 60 may be secured in place by suitable clamps (not shown) and supplied with electrical power by suitable wires (not shown). Optionally, on either side of the groove 56 are longitudinal cavities 58 that preferably run the length of the corresponding sub-channel 50. These cavities 58 are partially filled with water, the sub-channels 50 are heated to less than 212° F., and the cavities 58 are sealed shut, such as by welding. The result of this process is that the cavities 58 are under-filled with water at room temperature, and at a slight vacuum, but filled with hot steam at high temperature. The purpose of these cavities 58 is to distribute heat uniformly on their respective sub-channels 50 at high temperature. The cavities 58 are sealed to contain the subsequently re-generated steam and to prevent contamination.

Overall, the sub-channels 50 provide additional rigidity to the upper platen assembly 20. In essence, the ends of the platen assembly 20 are linked by the main platen channel 34 and by the sub-channels 50 "pinned" to the main platen 34 by the respective anchor bars 80 and/or binding bars 82.

Attached to the end portions of the main platen channel 34 is at least one, and preferably a plurality of expansion limiting rods 90. Preferably there is one expansion limiting rod 90 for each sub-channel 50. The expansion limiting rods 90 are connected on each end to the anchor bars 80. While the connection may be direct, each connection preferably includes an adjustable coupling 88. For instance, the ends of the expansion limiting rod 90 may be threaded with a threaded collar 88 attached. A strong screw 86 may be inserted through the anchor bar 80 and mated with the threaded collar 88 to adjustably connect the end of the expansion limiting rod 90 to the anchor bar 80. See FIGS. 2–4.

Figure 4:
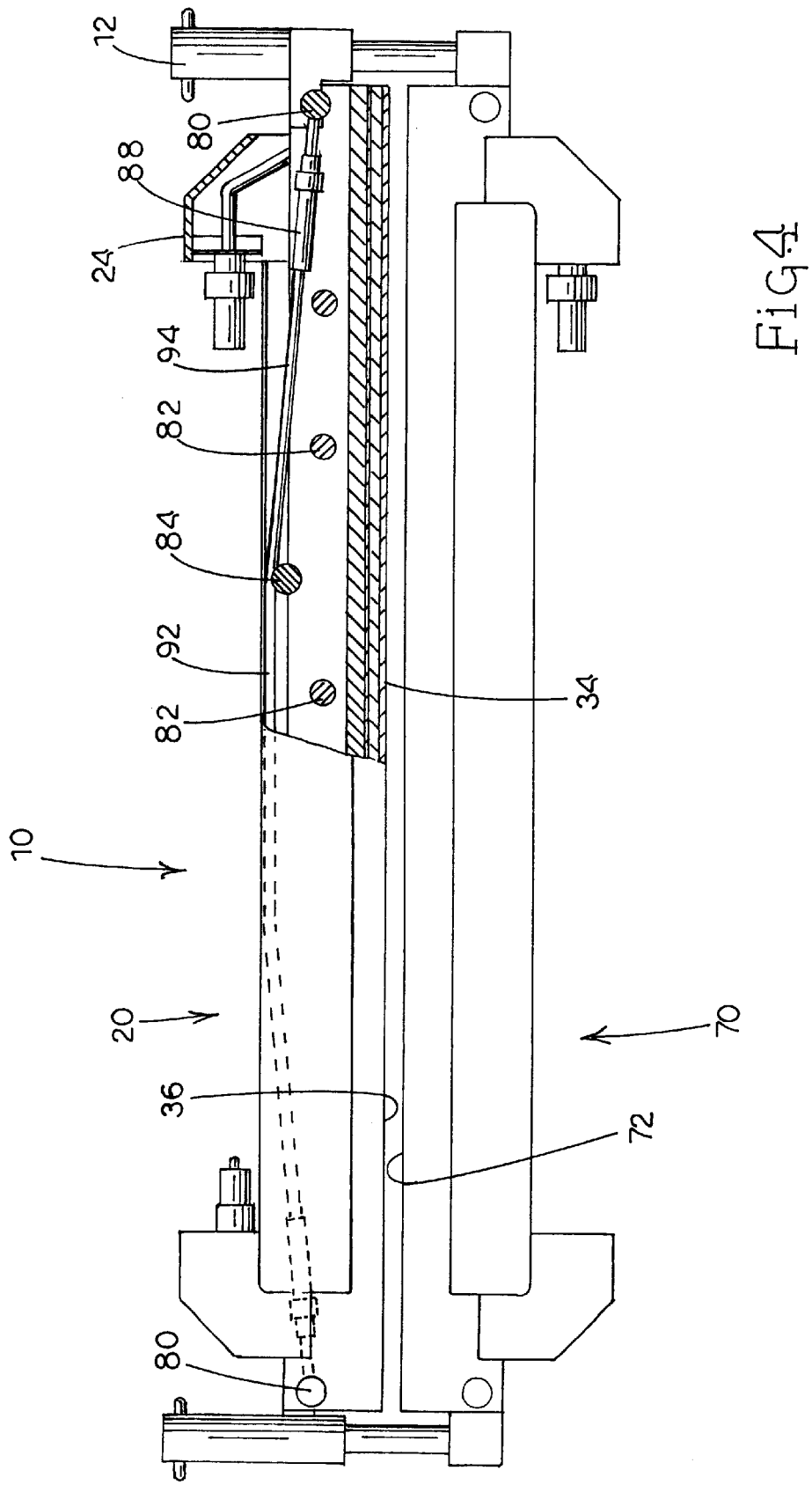
FIG. 4 is a partial sectional side view of the belt press of FIG. 1.

As shown in FIG. 4, the expansion limiting rods 90 preferably have a straight middle section 92 with sloped ends 94. The middle section 92 of the expansion limiting rods 90 preferably rest on two spaced apart and sturdy limit, or bridging bars 84 that stretch between the sidewalls 38 of the main platen channel 34. The limit bars 84 may include partial grooves for mating with the expansion limiting rods 90 and may include suitable notches or other features for mating to the sidewalls 38 of the main platen channel 34. The bridging bars 84 may have any suitable cross-section, such as square, hexagonal, and the like; however, the bridging bars 84 are preferably generally round in cross-section.

The material of the expansion limiting rod 90 should be able to withstand substantial tensile loads. Further, the expansion limiting rod 90 should have a coefficient of thermal expansion that is less than the coefficient of thermal expansion of the upper platen channel, for reasons more fully discussed below. For instance, the expansion limiting rod 90 may be steel with a coefficient of thermal expansion of approximately $11.7 \times 10^{-6}$ $C.^{-1}$ while the main upper platen channel 34 (and the sub-channels 50) may be aluminum with a coefficient of thermal expansion of approximately $23 \times 10^{-6}$ $C.^{-1}$.

The lower platen assembly 70 may be a simple flat plate, as the primary purpose is to support the belt material 14 against the push of the upper platen assembly 20. Indeed, the lower platen assembly 70 may provide a small or larger press surface 72 than the upper platen assembly 20. However, the lower platen assembly 70 preferably takes the same general configuration as the upper platen assembly 20, simply inverted. More preferably, the lower platen assembly 70 may be substantially identical to the upper platen assembly 20.

In some embodiments, the clamps 12 are hinged about the anchor bars 80 of the lower platen assembly 70. These clamps 12 may be simple hand crank clamps 12 having a moveable pawl for engaging the anchor bar 80 of the upper platen assembly 20. Alternatively, the clamps 12 may be completely removable and/or may take on any form known in the art. Further, clamps 12 per se are not required; instead, any means known in the art for limiting the relative separation motion between the respective press surfaces 36,72 may be used, such as hinging the platen assemblies 20,70 together and clasping on the other end. Preferably, the end securing approach does not require the use of any external power sources not otherwise required by the belt press 10.

The majority of the compression force generated by the belt press 10 is generated by differential thermal expansion. When heated, the main platen channel 34 and the sub-channels 50 want to expand along their longitudinal axis 39. However, their expansion is constrained by the expansion limiting rods 90. Because of the differences between the respective coefficients of thermal expansion, the expansion limiting rods 90 expand less than the channels 34,50. As such, the linear distance between the anchor bars 80 is constrained to be less than it otherwise would be. In response to this constraint, the platen assemblies 20,70 tend to bow inwardly very slightly. While this potential displacement is small, it generates significant pressure between the press surfaces 36,72, believed to be on the order of fifty psi.

To illustrate the operation of the belt press 10, it will be assumed that the belt press 10 is being used to join two belt ends to form a belt joint for a continuous belt. However, it is be understood that the belt press 10 may be used in other situations such as for repairing worn spots on belts and the like. The two belt ends are prepared in a conventional fashion and placed near each other. The lower platen assembly 70 is placed below the section of belt and the upper platen assembly 20 is placed over the belt section and the lower platen assembly 70. The clamps 12 are rotated to engage the anchor bars 80 of the upper platen assembly 20 and then snugly tightened, such as to approximately 150 in-lb. The platen assemblies 20,70 are connected to the appropriate electrical and coolant sources, including a controller (not shown). At this point, the platen assemblies 20,70 should be at or near ambient temperature.

With everything in place, the heating elements 60 are energized to heat the platen assemblies 20,70 until a thermocouple or the like indicates that the appropriate high temperature has been reached, for instance 150–180° C. The heat from the heaters 60 preferably causes the water in the cavities 58 to convert to steam, and this steam helps evenly distribute the heat throughout the sub-channels 50 and thus the press surfaces 36,72.

While the platen assemblies 20,70 are heating, the expansion limiting rods 90 act to constrain the thermal expansion of the channels 34,50 along the longitudinal axis 39. As described above, this causes significant compressive forces to be generated between the press surfaces 36,72. This compression force is supplied by leveraging off the high temperatures typically required for belt joint forming, rather than from some additional force supplier such as high pressure air or hydraulic lines. Preferably, the tension on the expansion limiting rods 90 has already been set, or adjusted, prior to heating via the adjustable couplings 88 so that the pressure in the middle of the press surfaces 36,72 is approximately even with that at both ends. Under ideal conditions, the tension on the expansion limiting rods 90 is uniform for all the rods 90; however this is not required. Typically this is achieved by tightening each of screws 86 to a snug condition at room temperature. Alternatively, the screws 86 may be tightened to a pre-set torque, such as approximately 50 in-lb. In either case, the objective of this initial tension is to get suitable pressure across the press surface 36. Further, the tension on the expansion limiting rods 90 may need to be re-adjusted after use to accommodate thermal hysteresis.

The belt press 10 is held at the desired temperature for a suitable time, such as ten minutes, and then the platens assemblies 20,70 are cooled by turning off the heaters 60 and running coolant through the coolant passages 40 or optional coolant tubes 43. As the platen assemblies 20,70 cool, the pressure on the belt material 14 generated by the differential thermal expansion lessens, eventually returning to the initial conditions. When the platen assemblies 20,70 have cooled sufficiently, the clamps 12 are loosened and the platen assemblies 20,70 are removed.

A belt press 10 as described above has been successfully operated. The belt press 10 used substantially identical platen assemblies 20,70 each having 6061 grade aluminum main platen channels 34 of 10½×3½×48 inch dimensions, five aluminum sub-channels 50 of 2×2¾×48 inch dimensions, five 680 watt electric resistance heaters 60, 1 inch diameter cold rolled steel anchor bars 80, six ¾ inch binding bars 82 laterally secured by spring clips, two 1 inch diameter cold rolled steel bars 84, five ⁷⁄₁₆ inch diameter steel expansion limiting rods 90 secured by ⅜ inch grade 8 socket head cap screws 86, and 1 inch diameter clamps 12. The belt press 10 successfully bonded a PVC conveyor belt section when held at 170° C. for a period of ten minutes.

In some embodiments, if multiple expansion limiting rods 90 are used, they are of substantially the same length. In other embodiments, some expansion limiting rods 90 may extend from one end portion of the platen assembly 20 to the other end portion, with other expansion limiting rods 90 extending from one end portion to a mediate area of the platen assembly 20 and a companion expansion limiting rods 90 extending from the mediate area to the other end portion of the platen assembly 20. These dual length embodiments would preferably include an additional anchor rod 80 disposed in the mediate area for anchoring the shorter expansion limiting rods 90. Such dual length embodiments may be helpful in ensuring adequate pressure distribution for very large platen assemblies, such as one that measure ten feet or more along the longitudinal axis 39. This approach can likewise be extended for platen assemblies having more subdivisions of expansion limiting rods 90 if appropriate; such extensions are intended to be within the scope of the present invention.

The discussion above has assumed that expansion limiting rods 90 are used as limiting members to resist the thermal expansion of the channels 34,50 in the direction of the longitudinal axis 39. However, in alternate embodiments, the limiting members may be cables (not shown) instead. Further, while it is assumed that the limiting members are uniform, the limiting members may be non-uniform along their length with respect to dimensions and/or coefficient of thermal expansion. Similarly, electrical resistance heating elements 60 have been used as the heat source for heating the platen assemblies 20,70. However, the present invention is not so limited and any heat source known in the art may be used, such as hot oil, steam, or the like.

While steel and aluminum have been used as exemplary materials having different coefficient of thermal expansion, other materials may be used without falling outside the scope of the present invention. It is believed that the coefficients of thermal expansion should preferably differ by a factor of two, but any ratio above about 1.5 may work with sufficient adjustment of the expansion limiting rods 90.

The belt press 10 described above includes a minimum of moving parts, thereby increasing product reliability. Most notably, the failure-prone inflatable bladders of the prior art are eliminated. The main parts of the belt press 10 need only be supplied with electrical power and coolant to function optimally. There is no need for high pressure air or hydraulic pressure generators. In addition, because the bulk of the platen assemblies 20,70 may be made from aluminum or other light, but strong materials, the weight of the platen assemblies 20,70 is reduced. Also, in the event one of the expansion limiting rods 90 breaks, the belt press 10 may still be made to operate by simply adjusting the pre-set tensions on the remaining expansion limiting rods 90.

Further, the design may be easily adapted for a wide variety of conditions. If more belt area needs to be pressed, then wider belt presses 10 may be easily made by simply increasing the number of sub-channels 50 and changing the dimensions of the main platen channel 34. Thus, the design described above provides a simple and reliable belt press 10 that requires a minimum of supply connections.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of operating a belt press, comprising:
   a) disposing a first press surface belonging to a first platen substantially parallel to and opposing a second press surface belonging to a second platen; said first platen having a longitudinal axis running between first and second end portions and disposed substantially parallel to said first press surface;
   b) disposing belt material between said press surfaces;
   c) restricting the movement of said first press surface relative to said second press surface in a direction generally normal to said first press surface; and
   d) thereafter, heating said first platen and, while heating, resisting the thermal expansion of said first platen generally along said longitudinal axis thereof by tensioning at least one limit member so as to cause said first press surface to press towards said second press surface between said first and second end portions, and thereby apply substantial compressive force to said belt material.

2. The method of claim 1 wherein said first platen has a first thermal expansion coefficient in said longitudinal direction and said limiting member has a second thermal expansion coefficient that is smaller than said first thermal expansion coefficient.

3. The method of claim 1 wherein said second press surface form a portion of a second platen and wherein said second platen is substantially similar to said first platen.

4. The method of claim 1 wherein a plurality of said limiting members perform said resisting.

5. The method of claim 1 wherein said first platen is substantially aluminum and wherein said limiting member is substantially steel.

6. The method of claim 1 further including:
   a) continuing to limit the thermal expansion of said first platen for a period of time while said first platen is hot; and
   b) thereafter, cooling said first platen and thereby substantially relaxing the compressive pressure created between said first press surface and said second press surface.

7. The method of claim 1 wherein said first platen includes at least one sealed cavity running substantially the entire length of said first platen, said cavity having water sealed therein at room temperature, and further including generating steam from said water sealed in said cavity during said heating.

8. The method of claim 1 further including, prior to said heating said first platen, adjusting at least one adjustable link associated with said limit member so as to control the amount of tension on said limit member when said first platen is heated.

9. A belt press, comprising:
   a) a first platen having a first press surface and having first and second end portions, said first platen further having a longitudinal axis running between said first and second end portions and disposed generally parallel to said first press surface, said first platen having a first thermal expansion coefficient in the direction along said longitudinal axis;
   b) a second platen connected to said first platen and having a second press surface substantially parallel to said first press surface; wherein movement of said second press surface away from said first press surface is limited proximate said first and second end portion of said first platen;
   c) at least one heater for heating said first platen;
   d) at least one limiting member attached to said first platen and having a second thermal expansion coefficient that is lower than said first thermal expansion coefficient;
   e) said limiting member resisting the thermal expansion of said first platen in the direction of said longitudinal axis when said first platen is heated, thereby causing said first press surface to press towards said second press surface.

10. The belt press of claim 9 wherein said second platen is substantially similar to said first platen.

11. The belt press of claim 9 wherein said limiting member connects to said first platen via adjustable links.

12. The belt press of claim 9 wherein said limiting member secures to said first platen proximate said first and second end portions, but not inbetween.

13. The belt press of claim 9 wherein said limiting member is a rod.

14. The belt press of claim 9 wherein said limiting member is a cable.

15. The belt press of claim 9 further including a plurality of said limiting members.

16. The belt press of claim 9 wherein said limiting member is disposed on said first platen generally opposite said first press surface and wherein said limiting member is generally convex with respect to said first press surface.

17. The belt press of claim 12 wherein said limiting member includes a first end portion and a second end portion and a mediate portion and wherein said mediate portion is generally parallel to said first press surface and said first and second end portions of said limiting member slope towards said first press surface.

18. The belt press of claim 9 wherein said first platen has sidewalls and further including at least one bridging bar running between said sidewalls, wherein said limiting member presses against said bridging bar when said first platen is heated.

19. The belt press of claim 9 wherein said first platen includes an outer channel forming said first press surface and a plurality of distinct inner channels affixed to said outer channel and running generally parallel to said longitudinal axis.

20. The belt press of claim 19 wherein said inner channels are affixed to said outer channel via respective anchor bars disposed on each of said first and second end portions and wherein said limiting member connects to said first platen via said anchor bars.

21. The belt press of claim 19 wherein at least one of said inner channels includes a sealed cavity running substantially the entire length of said inner channel, said cavity having water sealed therein at room temperature and steam generated from said water sealed therein at high temperature.

22. The belt press of claim 21 wherein substantially all of said inner channels include said sealed cavities.

23. The belt press of claim 9 wherein said first platen is substantially aluminum and wherein said limiting member is substantially steel.

24. A belt press, comprising:
   a) a first platen having first and second end portions and a longitudinal axis running therebetween and forming a first press surface, said first platen having a first thermal expansion coefficient in the direction along said longitudinal axis;
   b) said first platen including an outer channel forming said first press surface and a plurality of distinct inner channels affixed to said outer channel and running parallel to said longitudinal axis, said outer channel having sidewalls;
   c) at least one bridging bar running between said sidewalls;
   d) first and second anchor bars disposed on respective end portions of said first platen, said inner channels affixed to said outer channel via said anchor bars;
   e) a second platen connected to said first platen and having a second press surface substantially parallel to said first press surface; wherein movement of said second press surface away from said first press surface is limited proximate said first and second end portion of said first platen;
   f) at least one heater for heating said first platen;
   g) a plurality of limiting members attached to said anchor bars via adjustable links and disposed on said first platen generally opposite said first press surface, said limiting members having a second thermal expansion coefficient that is lower than said first thermal expansion coefficient; and
   h) said limiting members resisting the thermal expansion of said first platen in the direction of said longitudinal axis and pressing against said bridging bar when said first platen is heated, thereby causing said first press surface to press towards said second press surface.

25. The belt press of claim 24 wherein a plurality of said inner channels include respective sealed cavities running substantially the entire length of the corresponding inner channel, said cavities having water sealed therein at room temperature and steam generated from said water sealed therein at high temperature.

26. The belt press of claim 25 wherein said limiting members are generally convex with respect to said first press surface.

* * * * *